United States Patent
Lichtenberg

[11] 3,921,535
[45] Nov. 25, 1975

[54] ELECTRODYNAMIC SUSPENSION ARRANGEMENT

[75] Inventor: Alfred Lichtenberg, Erlangen, Germany

[73] Assignee: Siemens Aktiengesellschaft, Munich, Germany

[22] Filed: Feb. 26, 1974

[21] Appl. No.: 446,095

[30] Foreign Application Priority Data
Feb. 28, 1973 Germany............................ 2310024

[52] U.S. Cl...................... 104/148 SS; 104/148 MS
[51] Int. Cl.²........................................... B61B 13/08
[58] Field of Search.. 104/148 MS, 148 SS, 148 LM

[56] References Cited
UNITED STATES PATENTS
3,589,300 6/1971 Wipf............................... 104/148 SS
3,834,317 9/1974 Miericke........................ 104/148 SS Primary Examiner—M. Henson Wood, Jr.
Assistant Examiner—Reinhard J. Eisenzopf
Attorney, Agent, or Firm—Kenyon & Kenyon Reilly Carr & Chapin

[57] ABSTRACT

An improved electrodynamic suspension arrangement for a moving body, in which primary current carrying conductor loops located in the moving body cooperate with electrically conducting plates on the roadbed and wherein the plates on the roadbed have curved portions at their end for generating lateral guidance forces, which curved end portions are shaped such that they have at least approximately the same configuration as the magnetic field lines to thereby achieve exact lateral guidance with reduced losses.

1 Claim, 2 Drawing Figures

ELECTRODYNAMIC SUSPENSION ARRANGEMENT

BACKGROUND OF THE INVENTION

This invention relates to electrodynamic suspension arrangements of the type having at least one current carrying primary conductor loop located in a moving body and cooperating with an electrically conducting plate linearly arranged on a roadbed and more particularly to an improved arrangement of this nature which generates lateral guidance forces with reduced losses.

Electrodynamic suspension arrangements in which electromagnets or current carrying conductor loops on a vehicle cooperate, while the vehicle is in motion, with non-ferromagnetic conductor arrangements on the roadbed to generate lifting forces to keep the vehicle in a stable state of suspension during its movement, have previously been disclosed. An example of such an arrangement is that disclosed in German Offenlegungsschrift 1,952,757. One of the previously disclosed designs has a conductor arrangement formed by two rows of L-shaped non-ferromagnetic conductor elements on the roadbed to form a U-shaped cross section. The upward bent legs of the non-ferromagnetic conductors form a lateral guidance system. Through this arrangement, guidance forces and also braking forces are continuously produced in both legs. In other words, even if the vehicle is running symmetrical, braking forces result. In this proposed system, what is referred to as a normal flux method is used for suspension and guidance. As is well known, the normal flux method has relatively high braking losses.

Systems which overcome the high braking losses of the normal flux method, through using what is referred to as a zero flux method have also been developed. The zero flux method, however, requires a relatively large expenditure for the reaction rails if separate systems are to be used for the suspension and the guidance functions.

Thus, it can be seen that there is a need for an improved lateral guidance arrangement having reduced braking losses and which is obtained without the need for the large component expenditure associated with the above described zero flux method.

SUMMARY OF THE INVENTION

The present invention provides such an arrangement in a system of the kind described above by forming the non-ferromagnetic conductor on the roadbed, which is also referred to as a reaction rail, with a curved edge which has approximately the same shape as the magnetic field lines of the primary conductor loops when the moving body or vehicle is symmetrically positioned with respect to the roadbed. When the pattern of the magnetic lines of force and the shape of the electrically conducting plates, i.e., the reaction rail, coincide in this undeflected lateral guidance state of the body, a minimum of braking losses occur, since at most a few magnetic lines of force cut through the curved edge of the electrically conducting plates. Thus, if the vehicle is positioned in the plane of symmetry in the roadbed, no eddy current braking losses occur if the normal flux system is used for track guidance. If the moving body is deflected in one or the other direction due to an external influence such as a gust of wind, eddy currents which lead to corresponding restoring forces are generated in the curved edge of the conductor plate.

DETAILED DESCRIPTION OF THE PREFERRED EMBODIMENT

Figure 1:
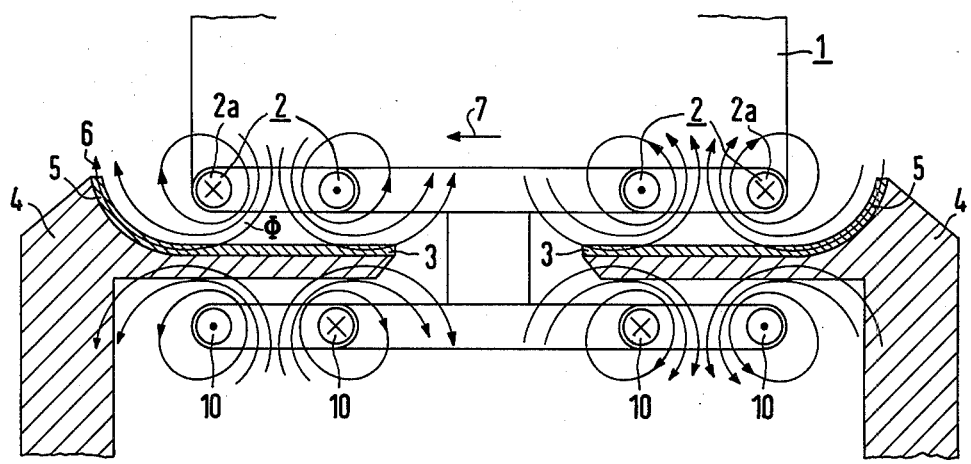
FIG. 1 is a cross section through a roadbed illustrating the curved conductor plate of the present invention.
Figure 2:
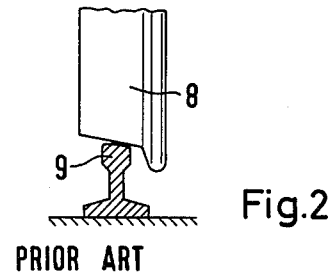
FIG. 2 is a cross sectional view of a conventional wheel resting on a rail, helpful in illustrating by analogy the effect of the arrangement of the present invention.

As illustrated by FIG. 1, primary current carrying superconductor loops 2 are arranged in a horizontal plane on both sides of a vehicle 1. The superconducting loops 2 each cooperate with a non-ferromagnetic rail 3 which is linearly arranged in a parallel horizontal plane. The rail 3 are arranged in fixed relation on support arms 4 of the roadbed. Assuming, for the moment, that the primary current carrying superconductor loops 10, which are similarly arranged in a horizontal plane below the rails 3, are not present, the conductor loops 2 along with the rails 3 form what is commonly referred to as a normal flux system. If the body 1, to which the conductor loops 2 are attached, moves perpendicular to the plane of the drawing, the magnetic field 6 of the current carrying conductor loops 2, in cooperation with the conductor plates 3, will generate lifting forces to hold the vehicle in suspension during motion. The curved outer edge of the plates 3 operate to generate lateral guidance forces. As illustrated, the conducting plates 3 are formed so that they have the same shape as the magnetic lines of force 6 when the moving body 1 is positioned symmetrically with respect to the roadbed. As long as the body 1 is in the plane of symmetry of the roadbed, only small reaction forces occur between the curved edge 5 and the sides of the coils 2a, due to the finite dimensions of the plates 3. Since the magnetic lines of force do not cut the curved end parts 5, no appreciable eddy current braking losses result from track guidance. If the body 1 is deflected laterally in the direction of the arrow 7, the lines of force which have a greater curvature in the vicinity of the conductor 2a, cut through the edge 5 of the conducting plates 3 producing eddy currents therein which lead to restoring forces. The result is similar to that of the conventional wheel and rail system illustrated by FIG. 2, in which necessary guidance forces are generated by the conical running surfaces of the wheels 8 which run on rail 9. In the present example, currents which result in a slight lifting of the support system with corresponding restoring forces, are produced in the curved edge portions 5 of the rails 3.

The effectiveness of the lateral guidance system is enhanced if the electrical conducting plates 3 are located between the conductor loops 2 and a further set of conductor loops 10, through which current flows in an opposite direction. In such a case, the density of the curved lines of force which are used in obtaining the lateral guidance will be greater.

Thus, an improved arrangement of the reaction rails in an electrodynamic suspension system has been shown. Although a specific embodiment has been illustrated and described, it will be obvious to those skilled in the art that various modifications may be made without departing from the spirit of the invention which is intended to be limited solely the appended claims.

What is claimed is:

1. In an electrodynamic suspension arrangement comprising at least one current carrying primary conductor loop mounted on a moving body and an electrically conducting plate linearly arranged on a roadbed for generating lifting forces in cooperation with the primary conducting loop, the improvement comprising:
(a) the electrically conducting plate on the roadbed having an outer portion curved such that the curve follows the shape of the magnetic lines of force of the primary conductor loop when the moving body is in a laterally symmetrical position relative to the roadbed; and
(b) a second current carrying primary conductor loop on the vehicle located on the opposite side of said plate and having a current flowing therethrough in the opposite direction from said one current carrying primary conductor loop.

* * * * *